United States Patent [19]
Rubin

[11] Patent Number: 6,040,974
[45] Date of Patent: Mar. 21, 2000

[54] CAPACITOR COVER

[75] Inventor: Steven A. Rubin, Sharon, Mass.

[73] Assignee: Universal Products, Inc., Brockton, Mass.

[21] Appl. No.: 08/277,330

[22] Filed: Jul. 19, 1994

[51] Int. Cl.$^7$ ............................................. H01G 9/10
[52] U.S. Cl. ..................... 361/519; 361/537; 174/50.57; 174/52.3
[58] Field of Search ..................... 361/272, 306.1, 361/307, 517–521, 535–539; 174/50.57, 50.63, 52.3, 52.5; 429/175, 178, 181; 215/200, 263; 220/200

[56] References Cited

U.S. PATENT DOCUMENTS

| | | |
|---|---|---|
| 1,920,799 | 8/1933 | Lilienfeld . |
| 2,627,538 | 2/1953 | Brennan . |
| 2,940,021 | 6/1960 | Hipperson ................. 361/520 |
| 2,941,024 | 6/1960 | Lamphier ................. 361/518 |
| 2,970,182 | 1/1961 | Miquelis ................. 174/52.3 |
| 3,182,238 | 5/1965 | Toder et al. ................. 361/272 |
| 3,237,060 | 2/1966 | Ross . |
| 3,256,382 | 6/1966 | Burnham et al. . |
| 3,292,054 | 12/1966 | Burnham et al. . |
| 3,428,869 | 2/1969 | Gilbert . |
| 3,569,794 | 3/1971 | Carino . |
| 3,644,796 | 2/1972 | Carino ................. 361/520 |
| 4,074,417 | 2/1978 | Pearce et al. ................. 174/52.3 |
| 4,525,022 | 6/1985 | Murray ................. 174/52.3 |

Primary Examiner—Bruce A. Reynolds
Assistant Examiner—Gregory L. Mills

[57] ABSTRACT

A capacitor cover for closing an open end of a capacitor, including an elastomeric outer layer, a rigid middle layer and a polypropylene inner layer, each with an aperture so as to allow passage of a terminal through the capacitor cover, is described. The inner layer has a peripheral skirt and an annular skirt which extend outwardly sufficiently to prevent electrolyte from the capacitor from coming into contact with the peripheral surface and the annular surface of the rigid middle layer. The capacitor cover can result in the capacitor achieving a temperature tolerance of at least about 105° C. An electrolytic capacitor, including a capacitor body, an electrolyte and a capacitor cover is also described.

28 Claims, 1 Drawing Sheet

CAPACITOR COVER

This invention relates generally to an improved capacitor cover for an electrolytic capacitor, and more particularly to the novel configuration of the capacitor cover.

BACKGROUND

Conventional capacitors generally include a cylindrical capacitor body with an open end, an electrolyte, a capacitor cover which fits onto the open end, and at least one terminal which passes through the capacitor cover. Various designs for capacitor covers have been suggested in attempts to provide a suitable seal around the edges where the capacitor cover fits onto the capacitor body and where the terminals pass through the capacitor cover.

SUMMARY OF THE INVENTION

According to the invention, a capacitor cover for closing an open end of a capacitor containing electrolyte is provided. The capacitor cover includes an elastomeric outer layer which has an inner surface and an aperture, a rigid middle layer which has an outer surface, an inner surface, a peripheral surface, an aperture and an annular surface which defines this aperture, and a polypropylene inner layer which has an outer surface, a peripheral skirt, an aperture and an annular skirt which is disposed around this aperture. The inner surface of the elastomeric outer layer is in contact with the outer surface of the rigid middle layer, and the inner surface of the rigid middle layer is in contact with the outer surface of the polypropylene inner layer. The three apertures are arranged so as to allow passage of a terminal through the capacitor cover. The peripheral skirt extends outwardly sufficiently to prevent the electrolyte of the capacitor from coming into contact with the peripheral surface of the rigid middle layer, and the annular skirt extends outwardly into the aperture of the rigid middle layer-sufficiently to prevent the electrolyte from the capacitor from coming into contact with the annular surface of the rigid middle layer. Preferably, the elastomeric outer layer is rubber, and preferably the rigid middle layer is a resin of the phenolic class.

In one embodiment of the invention, the peripheral skirt and the annular skirt of the polypropylene inner layer extend outwardly sufficiently so that the temperature tolerance of the capacitor is at least about 105° C.

Variations of the capacitor cover of this invention include the peripheral skirt extending outwardly to completely cover the peripheral surface of the rigid middle layer, or the peripheral skirt extending outwardly to partially cover the peripheral surface of the rigid middle layer, or the peripheral skirt covering the peripheral surface of the rigid middle layer but not covering the peripheral surface of the elastomeric outer layer.

Other variations include the annular skirt extending outwardly to completely cover the annular surface of the rigid middle layer, or the annular skirt extending outwardly to partially cover the annular surface of the rigid middle layer, or the annular skirt covering the annular surface of the rigid middle layer but not covering the annular surface of the elastomeric outer layer.

The invention also provides for an electrolytic capacitor which includes in combination, a capacitor body having an open end, an electrolyte within the capacitor body, and a capacitor cover which closes the open end. The capacitor cover includes the embodiment described above.

It is an object of the present invention to obtain high heat tolerances for capacitors while at the same time achieving such a result with the use of inexpensive materials.

It is another object of the invention to make a capacitor cover which minimizes leakage of electrolyte from the capacitor body through the side walls where the capacitor cover comes into contact with the capacitor body, and around the holes where terminals extend through the capacitor cover.

It is yet a further object of the invention to optimise preservation of the rigid middle layer of the capacitor cover by minimizing contact of electrolyte with the rigid middle layer of the capacitor cover.

The above and other features, objects and advantages of this invention will be better understood and appreciated from the following detailed description of several embodiments thereof, selected for purposes of illustration and shown in the accompanying drawings.

DETAILED DESCRIPTION

Figure 1:
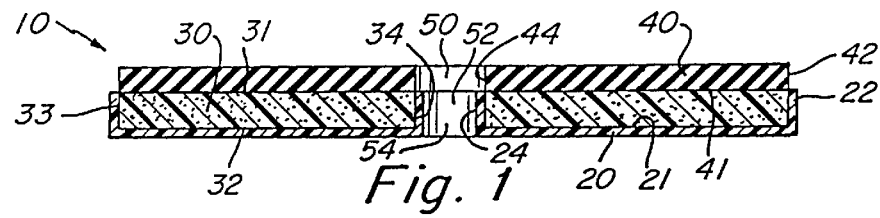
FIG. 1 is a cross-sectional view of a capacitor cover of the invention.
Figure 2:
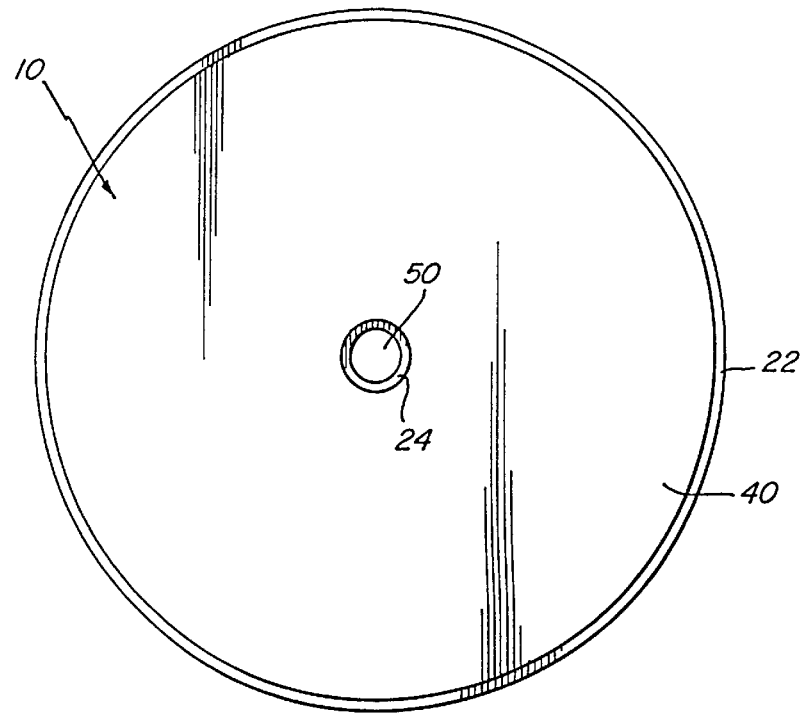
FIG. 2 is a top plan view of a capacitor cover of the invention.

FIGS. 1 and 2 depict a capacitor cover 10. As shown in FIG. 1, capacitor cover 10 has three layers, namely inner layer 20, middle layer 30, and outer layer 40. When the capacitor cover is assembled onto the capacitor, inner layer 20 is closest to the capacitor, whereas outer layer 40 is furthest from the capacitor. Outer layer 40 has an inner surface 41, a peripheral surface 42, an aperture 50 through which a terminal can extend, and an annular surface 44 which defines this aperture. Outer layer 40 can be manufactured from any of a variety of elastomers known to those skilled in the art, including rubber. Middle layer 30 has an outer surface 31, an inner surface 32, a peripheral surface 33, an aperture 52 through which a terminal can extend, and an annular surface 34 which defines this aperture. Middle layer 30 can be manufactured from a rigid material, preferably with electrical or heat insulating properties. Phenolic resin is a particularly suitable material for middle layer 30. Inner layer 20 has an outer surface 21, a peripheral skirt 22, an aperture 54 through which a terminal can extend, and an annular skirt 24 which is disposed around this aperture. Inner layer 20 should be constructed of a material which prevents direct contact between the electrolyte and the original middle layer. Particularly suitable material for inner layer 20 is polypropylene, either solid or foamed, and teflon.

Peripheral skirt 22 of inner layer 20 extends outwardly to cover at least part of peripheral surface 33 of middle layer 30. It should extend sufficiently outward to prevent electrolyte from the capacitor from coming into contact with peripheral surface 33 of middle layer 30. Preferably, peripheral skirt 22 completely covers peripheral surface 33 of middle layer 30, but does not extend sufficiently outward to cover peripheral surface 42 of outer layer 40.

Annular skirt 24 of inner layer 20 extends outwardly into aperture 52 of middle layer 30 to cover at least part of annular surface 34 of middle layer 30. It should extend sufficiently outward to prevent electrolyte from the capacitor from coming into contact with annular surface 34 of middle layer 30. Preferably, annular skirt 24 completely covers annular surface 34 of middle layer 30, but does not extend sufficiently outward to cover annular surface 44 of outer layer 40. However, the annular skirt and the peripheral skirt may extend upward to as high as 1/16" above the rubber and still perform the desired function of covering all the exposed surfaces of the middle layer 30. The combined outward extensions of peripheral skirt 22 and annular skirt 24 can result in temperature tolerances of about 105° C. for the capacitor.

Figure 3:
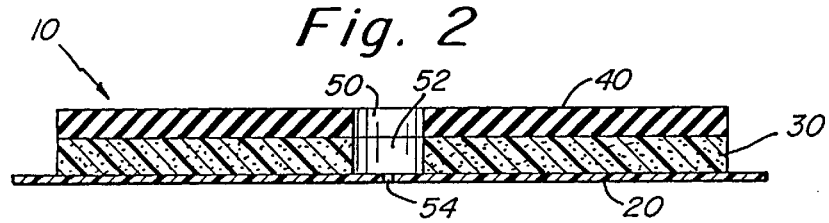
FIG. 3 is a cross-sectional view of a laminate of the outer, middle and inner layers of a capacitor cover of the invention prior to formation of the inner layer skirts.

The capacitor cover 10 can be formed by methods known to those skilled in the art. For example, outer layer 40 can be placed on top of middle layer 30 and the two layers bonded together by application of a suitable adhesive. A preformed die can then be used to cut the laminate into a perforated disc which forms the body of capacitor cover 10. The apertures 50 and 52 through outer layer 40 and middle layer 30 can be made either before or after the two layers are bonded together. A second die can be used to produce inner layer 20 which can be cut from a sheet of polypropylene. As shown in FIG. 3, the diameter of inner layer disc 20 can be made larger than the diameters of middle layer disc 30 and outer layer disc 40. The diameter of aperture 54 in the inner layer disc can be smaller than aperture diameter 52 of middle inner layer disc 30 and aperture diameter 50 of outer layer disc 40. The larger diameter of inner layer 20 provides material from which the peripheral skirt can be formed, and the smaller aperture diameter of inner layer 20 provides material from which the annular skirt can be formed. The inner layer disc can be placed on the middle layer surface of the laminate formed from the outer and middle layer discs, and bonded thereto by application of a suitable adhesive or by heat sealing it to the middle layer.

The peripheral skirt 22 and the annular skirt 24 can be formed by methods known to those skilled in the art. For example, the skirts can be formed by the application of heat and pressure to the lips that result from the fact that the inner layer disc has a larger disc diameter and a smaller aperture than those of the middle and outer layer discs. The distance that each of the skirts extends outwardly can be controlled in a number of ways, e.g., by increasing or decreasing the amount of peripheral and annular lip that is present on the inner layer disc.

Figure 4:
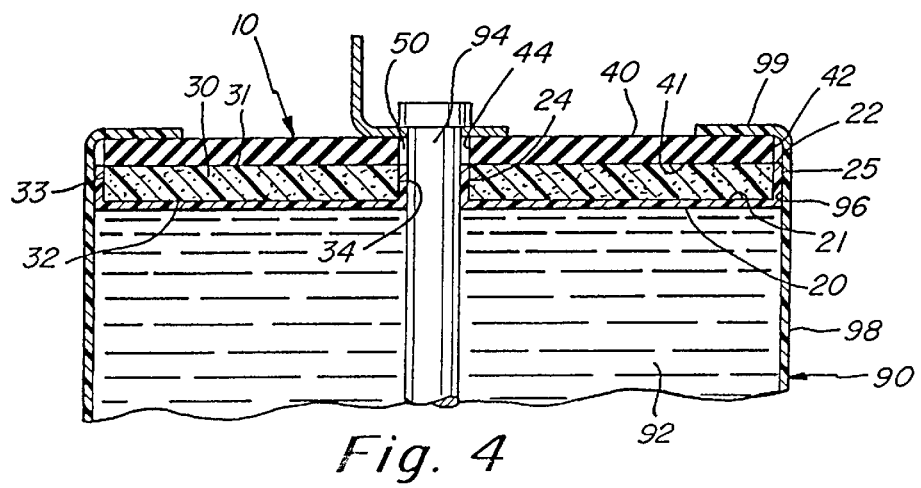
FIG. 4 is a cross-sectional view of a capacitor cover of the invention assembled on a conventional capacitor body so as to close an open end of the capacitor body.

As shown in FIG. 4, the finished capacitor cover 10 can be used to close one end of a conventional capacitor body 90. Outside edge 25 of capacitor cover 10 mates securely with inner edge 96 of capacitor jacket 98, and terminal 94 of the capacitor passes through the apertures of capacitor cover 10. Capacitor jacket 98 has a lip portion 99 which is formed about the periphery of cover 10. When capacitor cover 10 is in place on capacitor body 90, electrolyte 92 should not come into contact with the peripheral surface 33 or annular surface 34 of middle layer 30 of capacitor cover 10.

Having described this invention in detail, those skilled in the art will appreciate that numerous modifications may be made thereof without departing from the spirit of this invention. Therefore, it is not intended that the breadth of this invention be limited to the specific embodiments illustrated and described. Rather, its breadth is to be determined by the appended claims and their equivalents.

I claim:

1. A capacitor cover for closing an open end of a capacitor containing electrolyte, comprising:

an elastomeric outer layer having an inner surface and a first aperture, a rigid middle layer having an outer surface, an inner surface, a peripheral surface, a second aperture and an annular surface defining said second aperture, a polypropylene inner layer having an outer surface, a peripheral skirt, a third aperture and an annular skirt disposed around said third aperture, said inner surface of said elastomeric outer layer being in contact with said outer surface of said rigid middle layer and said inner surface of said rigid middle layer being in contact with said outer surface of said polypropylene inner layer, said first, second and third apertures disposed so as to allow passage of a terminal through said capacitor cover, said peripheral skirt extending sufficiently to prevent said electrolyte of said capacitor from coming into contact with said peripheral surface of said rigid middle layer, and said annular skirt extending into said second aperture sufficiently to prevent said electrolyte of said capacitor from coming into contact with said annular surface of said rigid middle layer.

2. The capacitor cover of claim 1 wherein said elastomeric outer layer is rubber.

3. The capacitor cover of claim 1 wherein said rigid middle layer is a resin of the phenolic class.

4. The capacitor cover of claim 1 wherein said peripheral skirt completely covers said peripheral surface of said rigid middle layer.

5. The capacitor cover of claim 1 wherein said peripheral skirt at least partially covers said peripheral surface of said rigid middle layer.

6. The capacitor cover of claim 1 further comprising a peripheral surface of said elastomeric outer layer, wherein said peripheral skirt covers said peripheral surface of said rigid middle layer but does not cover said peripheral surface of said elastomeric outer layer.

7. The capacitor cover of claim 1 wherein said annular skirt completely covers said annular surface of said rigid middle layer.

8. The capacitor cover of claim 1 wherein said annular skirt at least partially covers said annular surface of said rigid middle layer.

9. The capacitor cover of claim 1 further comprising an annular surface defining said first aperture of said elastomeric outer layer, wherein said annular skirt covers said annular surface of said rigid middle layer but does not cover said annular surface of said elastomeric outer layer.

10. A capacitor cover for closing an open end of a capacitor containing electrolyte, comprising:

an elastomeric outer layer having an inner surface and a first aperture, a rigid middle layer having an outer surface, an inner surface, a peripheral surface, a second aperture and an annular surface defining said second aperture, a polypropylene inner layer having an outer surface, a peripheral skirt, a third aperture and an annular skirt disposed around said third aperture, said inner surface of said elastomeric outer layer being in contact with said outer surface of said rigid middle layer and said inner surface of said rigid middle layer being in contact with said outer surface of said polypropylene inner layer, said first, second and third apertures disposed so as to allow passage of a terminal through said capacitor cover, and wherein the temperature tolerance of said capacitor is at least about 105° C.

11. The capacitor cover of claim 10 wherein said elastomeric outer layer is rubber.

12. The capacitor cover of claim 10 wherein said rigid middle layer is a resin of the phenolic class.

13. The capacitor cover of claim 10 wherein said peripheral skirt extends outwardly to completely cover said peripheral surface of said rigid middle layer.

14. The capacitor cover of claim 10 wherein said peripheral skirt extends outwardly to at least partially cover said peripheral surface of said rigid middle layer.

15. The capacitor cover of claim 10 further comprising a peripheral surface of said elastomeric outer layer, wherein said peripheral skirt covers said peripheral surface of said rigid middle layer but does not cover said peripheral surface of said elastomeric outer layer.

16. The capacitor cover of claim 10 wherein said annular skirt extends outwardly to completely cover said annular surface of said rigid middle layer.

17. The capacitor cover of claim 10 wherein said annular skirt extends outwardly to at least partially cover said annular surface of said rigid middle layer.

18. The capacitor cover of claim 10 further comprising an annular surface defining said first aperture of said elastomeric outer layer, wherein said annular skirt covers said annular surface of said rigid middle layer but does not cover said annular surface of said elastomeric outer layer.

19. An electrolytic capacitor, comprising in combination:

a capacitor body having an open end, an electrolyte within said capacitor body, and a capacitor cover which closes said open end comprising an elastomeric outer layer having an inner surface and a first aperture, a rigid middle layer having an outer surface, an inner surface, a peripheral surface, a second aperture and an annular surface defining said second aperture, a polypropylene inner layer having an outer surface, a peripheral skirt, a third aperture and an annular skirt disposed around said third aperture, said inner surface of said elastomeric outer layer being in contact with said outer surface of said rigid middle layer and said inner surface of said rigid middle layer being in contact with said outer surface of said polypropylene inner layer, said first, second and third apertures disposed so as to allow passage of a terminal through said capacitor cover, said peripheral skirt extending outwardly sufficiently to prevent said electrolyte of said capacitor from coming into contact with said peripheral surface of said rigid middle layer, and said annular skirt extending outwardly into said second aperture sufficiently to prevent said electrolyte of said capacitor from coming into contact with said annular surface of said rigid middle layer.

20. The electrolytic capacitor of claim 19, further comprising a terminal which passes through said first, second and third apertures.

21. The electrolytic capacitor of claim 19 wherein said elastomeric outer layer is rubber.

22. The electrolytic capacitor of claim 19 wherein said rigid middle layer is a resin of the phenolic class.

23. The electrolytic capacitor of claim 19 wherein said peripheral skirt extends outwardly to completely cover said peripheral surface of said rigid middle layer.

24. The electrolytic capacitor of claim 19 wherein said peripheral skirt extends outwardly to at least partially cover said peripheral surface of said rigid middle layer.

25. The electrolytic capacitor of claim 19 further comprising a peripheral surface of said elastomeric outer layer, wherein said peripheral skirt covers said peripheral surface of said rigid middle layer but does not cover said peripheral surface of said elastomeric outer layer.

26. The electrolytic capacitor of claim 19 wherein said annular skirt extends outwardly to completely cover said annular surface of said rigid middle layer.

27. The electrolytic capacitor of claim 19 wherein said annular skirt extends outwardly to at least partially cover said annular surface of said rigid middle layer.

28. The electrolytic capacitor of claim 19 further comprising an annular surface defining said first aperture of said elastomeric outer layer, wherein said annular skirt covers said annular surface of said rigid middle layer but does not cover said annular surface of said elastomeric outer layer.

* * * * *